United States Patent [19]

Rabino

[11] Patent Number: 4,794,719
[45] Date of Patent: Jan. 3, 1989

[54] FISHING ROD ALARM DEVICE

[76] Inventor: Villarosal A. Rabino, 3015 Harrison St., San Francisco, Calif. 94110

[21] Appl. No.: 179,713

[22] Filed: Apr. 11, 1988

[51] Int. Cl.$^4$ .............................................. A01K 97/12
[52] U.S. Cl. ....................................................... 43/17
[58] Field of Search ....................................... 43/17, 16

[56] References Cited

U.S. PATENT DOCUMENTS

| | | | |
|---|---|---|---|
| 2,986,835 | 6/1961 | Ordinetz | 43/17 |
| 3,702,513 | 11/1972 | Watts | 43/17 |
| 3,820,268 | 6/1974 | Newton . | |
| 3,959,910 | 6/1976 | Montgomery . | |
| 4,214,394 | 7/1980 | Shogan . | |
| 4,398,185 | 8/1983 | Roberts, Sr. . | |
| 4,447,979 | 5/1984 | Taylor | 43/17 |
| 4,458,437 | 7/1984 | Ou . | |
| 4,466,211 | 8/1984 | Mathauser . | |
| 4,471,555 | 9/1984 | Soukup . | |
| 4,507,890 | 4/1985 | Thorne | 43/17 |

*Primary Examiner*—Gene P. Crosby
*Attorney, Agent, or Firm*—Townsend and Townsend

[57] ABSTRACT

A fishing alarm is used with a fishing rod and reel and includes a case clamped to the rod. An alarm circuit is mounted to the case and includes, in series, first and second signal contacts, a light and buzzer combination, a battery, and an enabling switch. The first signal contact includes a pair of recessed contact elements positioned between outwardly extending support surfaces. The second signal contact includes a pair of protruding, movable contact elements spring biased towards the recessed contact elements. The recessed and protruding contact elements are sized and positioned so to complete the circuit when engaged. When the fishing line is placed between the support surfaces and the protruding contact elements, the protruding and recessed contact elements are kept separated. When a fish bites, the line tension increases to pull the line from between the contacts to permit the light and buzzer to operate. Since the fishing line only touches one of the two contact elements, false alarms from a wet line are eliminated.

5 Claims, 1 Drawing Sheet

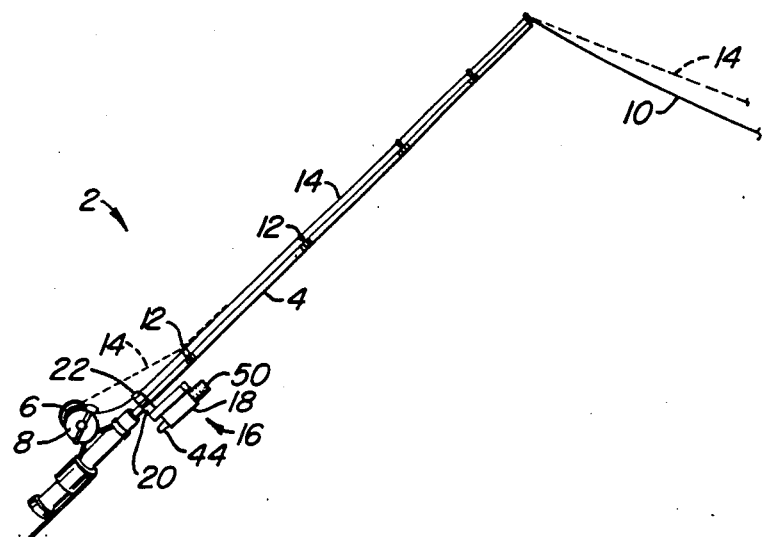
FIG._1.
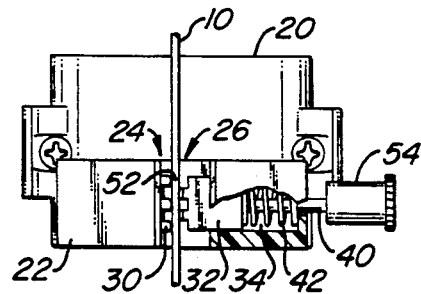
FIG._2.
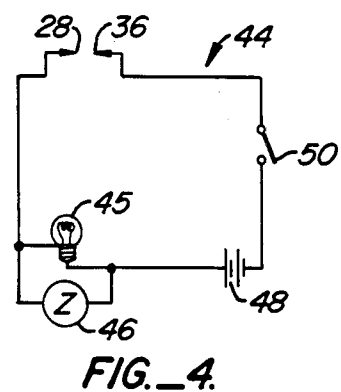
FIG._4.
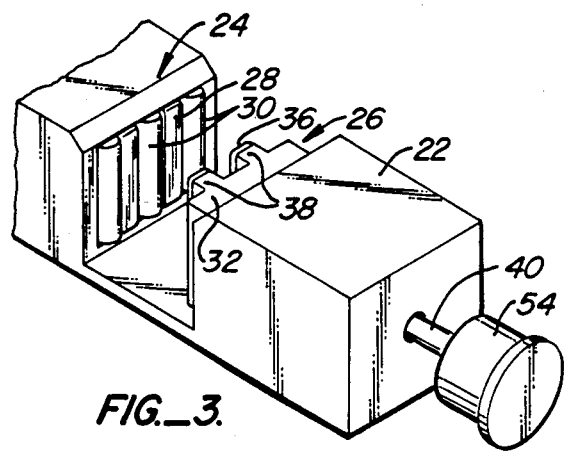
FIG._3.

FISHING ROD ALARM DEVICE

BACKGROUND OF THE INVENTION

Alarms and other indicators have been developed to alert anglers of a possible bite while fishing. One type uses a pair of contacts which are biased towards one another, the contacts being separated by a segment of the fishing line. When the line is pulled free, hopefully by a fish biting the bait, the contacts come together to initiate an alarm. See, for example, U.S. Pat. No. 3,702,513 to Watts.

When the contact elements are conductive, the possibility of false alarms arises. When the fishing line is wet. Water on the line may bridge the contacts and provide a low resistance path to complete the alarm circuit and create a false alarm.

SUMMARY OF THE INVENTION

The invention is directed to a fishing alarm of the type used with a fishing rod and reel combination. The alarm is actuated when the line, which is engaged by the alarm, is pulled taut indicating a bite or strike at the bait or lure.

The alarm includes a case which is mounted to the rod. The alarm also includes an alarm circuit mounted to the case. The alarm circuit includes first and second signal contacts in series with a source of electricity, a signal element, such as a buzzer or a light (or both) and, preferably, an enabling switch. The signal contacts are movable relative to one another. The first signal contact includes one or more recessed contact elements and outwardly extending support surfaces adjacent the recessed contact elements. The second signal contact includes one or more protruding contact elements which are configured for mating engagement with the recessed contact elements. The alarm circuit is completed, thus actuating the signal element, when the protruding and recessed contacts touch one another.

The first and second signal contacts are configured so that when a portion of the fishing line is placed between them, the fishing line contacts the support surfaces on one side and the protruding contact elements on the other. The line, in this position, keeps the recessed and protruding contact elements away from one another. Since the fishing line is not in contact with the recessed contact elements, false alarms due to wet fishing line are substantially eliminated. The resulting structure is simple in construction, easy to use and substantially eliminates a source of false alarms.

Other features and advantages of the invention will appear from the following description in which the preferred embodiment has been set forth in detail in conjunction with the accompanying drawing.

BRIEF DESCRIPTION OF THE DRAWING

FIG. 1 is an overall view of a rod and reel combination to which a fishing alarm made according to the invention is mounted.

FIG. 2 is a top view of the supplemental case and clamp of the alarm of FIG. 1.

FIG. 3 is an enlarged view of the supplemental case of FIG. 2 with the second signal contact retracted.

FIG. 4 is a schematic circuit diagram of the alarm circuit.

DETAILED DESCRIPTION OF THE PREFERRED EMBODIMENT

Referring now to the figures, a fishing rod and reel combination 2 is shown to include a rod 4 and a reel 6 containing a supply 8 of line 10. Line 10 is guided along rod 4 by a number of guides 12. Line 10, when taut, follows a line path 14, end portions of which are shown in dashed lines with the central portion, which coincides with the path of line 10 when slack, is shown as a solid line.

A fishing alarm 16 is mounted directly to rod 4 near reel 6. Alarm 16 includes a main case 18, mounted to rod 4 on the side of the rod opposite line 14 by a clamp 20. A supplemental case 22, see also FIGS. 2 and 3, is mounted to clamp 20 on the opposite side of rod 4 as main case 16.

Supplemental case 22 carries first and second signal contacts 24, 26. First signal contact 24 includes a pair of recessed contact elements 28 fixed to supplemental case 22 and bordered on either side by protruding support surfaces 30. Second signal contact 26 is carried by a slider 32 mounted within a slider housing 34 of supplemental case 22 for movement towards and away from first contact element 24.

Second signal contact 26 includes a pair of protruding contact elements 36 mounted at the ends of extensions 38 of slider 32. Slider 32 is mounted to the end of a plunger 40 and is biased towards first signal contact 24 by a spring 42. When the pathway between first and second signal contacts 26 is free of obstructions, protruding contact elements 36 pass between support surfaces 30 to touch recessed contact elements 28 thus completing an alarm circuit 44, shown in FIG. 4.

Alarm circuit 44 includes, in series, recessed and protruding contacts elements 28, 36, a light 45 and a buzzer 46 in parallel with one another, a battery 48, and an enabling switch 50. Thus, with enabling switch 50 closed, movement of second signal contact 26 towards first signal contact 24 from an opened condition to a closed condition completes circuit 44 causing light 45 and buzzer 46 to actuate.

To keep contact elements 28, 36 apart, a portion 52 of line 10, see FIG. 2, is placed between first and second signal contacts 24, 26 and is maintained in position by the force of spring 42. The position of line 10 when captured between signal contacts 24, 26 is shown by the solid line position of line 10 in FIG. 1. When a fish bites or strikes, line 10 moves towards its taut line position, indicated by dashed-solid-dashed line path 14. This causes line portion 52 to be pulled out from between support surfaces 30 on one side and protruding contact elements 36 on the other, thus permitting recessed and protruding contact elements 28, 30 to touch one another. This actuates buzzer 46 and illuminates light 45.

It can be appreciated that line portion 52 does not contact recessed contact elements 28. Therefore, even if line portion 52 is wet or otherwise electrically conductive, the circuit path between contact elements 28, 36 will remain open until portion 10 is removed from between first and second signal contacts 24, 26.

In use, the angler casts line 10, grasps the handle 54 at the end of plunger 40 and pulls slider 32 away from first signal contact 24. Portion 52 of line 10 is then positioned between first and second signal contacts 24, 26 and in the path of slider 32. Handle 54 is then released by the user allowing spring 42 to push protruding contact elements 36 against portion 52 of line 10 thus capturing the line between protruding contact elements 36 and support surfaces 30. Enabling switch 50 is then closed to enable alarm circuit 44. Upon exertion of a sufficient tension on line 10, line portion 52 is pulled out from between first and second signal contacts 24, 26 allowing recessed and protruding contact elements 28, 36 to touch thus completing alarm circuit 44 so to sound buzzer 46 and illuminate light 45. The user is thus provided an instantaneous indication of a possible bite.

Modification and variation can be made to the disclosed embodiment without departing from the subject of the invention as defined in the following claims. For example, other types of signal elements in addition to or instead of buzzer 46 and light 45 could be used. One or the other of buzzer 46 and light 45 could be disabled or removed in case it is not needed or desired. The tension force required to pull line 10 from between contacts 24, 26 may be varied. One way of doing so would be to adjust the force applied by spring 42 against slider 32. The device may also include a cover or flap extending over the contacts to keep them clean during storage or during use of the pole without the alarm. The cover or flap would, additionally protect against rain.

What is claimed is:

1. A fishing alarm, for use with a fishing rod and reel combination of the type having a reel holding a supply of line, a rod and a guide mounted to the rod for guiding the line along a taut line path from the reel to a position on the rod, the alarm comprising:

a case mountable to the rod adjacent the line path;
   an alarm circuit mounted to the case, the alarm circuit including a source of electricity, a signal element and first and second signal contacts movable along a contact path between open and closed conditions;
   means for biasing the signal contacts towards one another to a closed condition so to complete the alarm circuit when in the closed condition;
   the first signal contact including a recessed contact element and a support surface laterally adjacent the recessed contact element but spaced apart along the contact path from the recessed contact element towards the second signal contact;
   the second signal contact including a protruding contact element sized and positioned for engagement with the recessed contact element when in the closed condition;
   the second signal contact and the support surface configured and positioned to engage a portion of the line which is laterally deflected from the taut line path into the contact path so to prevent the recessed and protruding contact elements from touching one another; and
   the biasing means sized to permit the line portion to return to the line path when the tension on the line exceeds a chosen level so to allow the recessed and protruding contact elements to touch one another to complete said alarm circuit causing the signal element to alert the user.

2. The fishing alarm of claim 1 wherein the alarm circuit includes a main switch for selectively enabling the alarm circuit.

3. The fishing alarm of claim 1 wherein the signal element includes a light.

4. The fishing alarm of claim 1 wherein the signal element includes a visual signal element and an audible signal element in parallel with one another.

5. The fishing alarm of claim 1 wherein the first signal contact is stationary relative to the case.

* * * * *